United States Patent [19]

Larsson et al.

[11] Patent Number: 4,940,474
[45] Date of Patent: Jul. 10, 1990

[54] SUCTION CLEANER

[75] Inventors: Anders E. C. Lársson, Stockholm; Joakim A. Svanberg, Johanneshov; Lars G. Kilström, Täby; Lars G. Tuvin, Knivsta, all of Sweden

[73] Assignee: Aktiebolaget Electrolux, Stockholm, Sweden

[21] Appl. No.: 351,077

[22] Filed: May 11, 1989

[30] Foreign Application Priority Data

May 25, 1988 [SE] Sweden ............................ 8801939

[51] Int. Cl.$^5$ ............................................ B01D 46/00
[52] U.S. Cl. .............................. 55/210; 55/DIG. 34
[58] Field of Search .................... 55/213, 214, DIG. 3, 55/34, 271, 21

[56] References Cited

U.S. PATENT DOCUMENTS

| 3,180,071 | 4/1965 | Nolte | 55/213 |
| 4,294,595 | 10/1981 | Bowerman | 55/213 |
| 4,784,675 | 11/1988 | Leber et al. | 55/213 |
| 4,786,295 | 11/1988 | Newman | 55/213 |
| 4,820,317 | 4/1989 | Fahey | 55/21 |

Primary Examiner—Bernard Nozick
Attorney, Agent, or Firm—Pearne, Gordon, McCoy & Granger

[57] ABSTRACT

In a suction cleaner comprising a housing (10) having an inlet (11), a filter chamber (12) with a filter bag (13), a suction fan (14) with a motor (15), and an outlet passage (17) through which filtered air passes from the suction fan to an outlet (16), the motor is provided with a control circuit (20) adapted to be activated by a first pressure switch (21) which is actuated by the underpressure in the filter chamber (12) in order to control the motor power at a predetermined level. According to the invention, the suction cleaner is provided with a second pressure switch (22) which is actuated by the pressure in the outlet (17) and adapted to activate the control circuit (20) when said pressure exceeds a predetermined level.

1 Claim, 1 Drawing Sheet

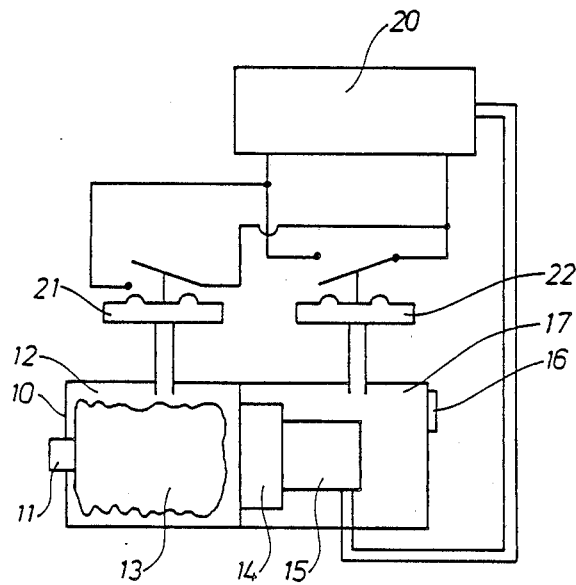

SUCTION CLEANER

The present invention relates to a suction cleaner comprising a housing having an inlet for dust-laden air, a filter chamber with a filter bag, a suction fan, a motor, and an outlet passage through which filtered air flows from said suction fan to an outlet, said motor having a control circuit adapted to be activated by a first pressure switch actuated by the underpressure in the filter chamber in order to control the motor power at a predetermined level.

By means of the control circuit the underpressure (i.e. partial vacuum) is restricted to a predetermined value in that the power of the motor is automatically reduced when this value is exceeded. The suction cleaning nozzle is thereby prevented from adhering by suction to the surface to be cleaned, for example during cleaning of soft carpets. It is a disadvantage of this arrangement, however, that the air flow increases when the nozzle is raised from the surface, since the sensed underpressure is reduced. The disadvantage of the increased air flow is that is produces a disturbing noice.

The object of the present invention is to provide a suction cleaner in which this disadvantage has been eliminated. This has been obtained by means of a suction cleaner of the type mentioned in the introduction which according to the invention is characterized by a second pressure switch actuated by the pressure in the outlet passage and adapted to activate the control circuit when said pressure exceeds a predetermined level.

The invention will be described in more detail in the following with reference to the accompanying drawing which illustrates a diagrammatical longitudinal section of a suction cleaner provided with the control equipment according to the invention which is also shown diagrammatically.

The suction cleaner shown in the drawing comprises a housing 10 having an inlet 11, a filter chamber 12 with a filter bag 13, a suction fan 14, a motor 15, and an outlet 16.

A control circuit 20 of a known type is connected to the motor 15, said control circuit being adapted, when activated, to reduce the motor power to a predetermined level. The control circuit is connected to a first pressure switch 21 which is actuated by the pressure in the filter chamber 12 and activates the control circuit when this pressure falls below a predetermined value. An excessive increase of the underpressure causing the nozzle to adhere by suction to the surface to be cleaned is thereby prevented.

A second pressure switch 22 is connected to the control circuit 20 in parallel with the first pressure switch 21. The second switch is actuated by the pressure in the outlet passage 17 between the fan 14 and the outlet 16 and activates the control circuit when this pressure exceeds a predetermined level. The flow of air through the suction cleaner and consequently also the sound level are thereby reduced in response to a decreasing suction resistance, such as when the nozzle is raised from the surface to be cleaned.

In accordance with the invention, a suction cleaner has thus been provided in which the underpressure as well as the air flow have been restricted to suitable, predetermined levels.

We claim:

1. In a suction cleaner having a housing (10) including an inlet (11) for dust-laden air, a filter chamber (12) with a filter bag (13), a suction fan (14), a motor (15), and an outlet passage (17) through which filtered air flows from said suction fan to an outlet (16), said motor (15) having a control circuit (20) including a first pressure switch (21) communicating with the filter chamber and actuated by the underpressure in the filter chamber to control the motor speed below a predetermined level, the improvement comprising a second pressure switch (22) communicating with the outlet passage, the second pressure switch (22) being actualable by the pressure in the outlet passage (17) and being connected to the control circuit (20) to limit fan speed when said pressure in the outlet passage exceeds a predetermined level, both of said pressure switches (21, 22) being interconnected in parallel.

* * * * *